United States Patent Office 3,709,721
Patented Jan. 9, 1973

3,709,721
HEAT AND ABRASION RESISTANT TEXTILES
James Ping King, Lansdale, Pa., assignor to Pennnwalt Corporation, Philadelphia, Pa.
No Drawing. Filed Sept. 14, 1970, Ser. No. 72,226
Int. Cl. B44d *1/08, 1/02*
U.S. Cl. 117—104 R          7 Claims

ABSTRACT OF THE DISCLOSURE

A textile (such as a fiber or fabric) of high abrasion and heat resistance and high fold endurance is provided by a structure comprising a high melting textile substrate (such as glass) bearing a coating of polytetrafluoroethylene (PTFE) which coating contains from about 1% to about 30% by weight based on the said coating of a hard, water insoluble, particulate filler of one to 75 microns diameter.

BACKGROUND OF THE INVENTION

The use of polytetrafluoroethylene (PTFE) coatings upon textiles is well known in the art. It is known to be of particular value in coating textiles formed from fibrous materials of a brittle nature, particularly those of an inorganic nature such as glass, asbestos (U.S. 3,347,737) and graphite, (U.S. 3,108,018) to improve surface lubricity. Coating compositions useful in impregnating substrates such as glass fibers or glass cloth are taught in U.S. 2,562,117 (which teaches a liquid coating composition containing PTFE and chromic acid), U.S. 2,562,118 (which provides a liquid coating composition containing PTFE, chromic acid and phosphoric acid), U.S. 2,613,193 (showing a sprayable PTFE aqueous suspensoid containing PTFE, a wetting agent, water and an organic liquid) and U.S. 2,710,266 (which describes an aqueous dispersion of colloidal PTFE containing an alkali metal silicate). Despite the improved strength and surface lubricity attributable to the PTFE coating, such coated structures still possess a relatively low abrasion resistance and fold endurance, limiting their practical usefulness. Some of these coated structures also tend to store electrical charges making them unsuitable for uses where static electricity is to be avoided.

SUMMARY OF THE INVENTION

In accordance with the present invention, a textile is provided which bears a coating of PTFE, which coating contains from about 1% to about 30% by weight based on the said coating of a hard particulate filler of from one to 75 microns in diameter. The resulting textile is characterized by high abrasion resistance and high fold endurance. When the "particulate matter" is metallic, the structures are also found to possess high electrical conductivity and ability to dissipate static charge.

DESCRIPTION OF THE PREFERRED EMBODIMENTS

In the examples which follow, "abrasion resistance" is measured by the ASTM–D–1044 method, using a Tabor Abrasor Model 505 with a CS–17 head under a 500 gram load and for 1000 cycles. Folding endurance is determined using the method described in ASTM–D–2176 employing a 1000 gram load, the figure given being an average of five samples measured in each direction. Unless otherwise indicated, static charge in coulombs is measured on a Sweeney Fabric Static Charge Tester Model No. SWE–1190 at 25° C. and 50% relative humidity and surface resistivity, in ohms/cm.$^2$, is measured at 25° C. and 10% relative humidity. In each example, 30 grams of an aqueous emulsion containing about 50% PTFE resin as the dispersed phase and having 1.5 gram of filler with a particle size of at least one micron suspended in it, is sprayed on both sides of a piece of plain weave, silicone finished glass fabric (7 mils). The silicone finish is not essential and when it is desired on the glass fabric, it is applied by spraying the fabric on each side with commercially available silane or silicone finishes such as alpha-methacryloxypropyl-trimethoxysilane or alpha-aminopropyltriethoxysilane followed by drying and curing the silicon finish under conditions prescribed by the manufacturer. Typical silicone finishes are sold by Union Carbide Corporation under the designation AP131 and AP134 by J. P. Stevens, Inc. as J. P. Stevens 9362. The mechanical properties of the PTFE coated structure are substantially unaffected by changing the silicone finish. After application of the PTFE emulsion, the fabric is dried in air at room temperature and then cured at 380° C. for the indicated periods. The observed static charges and resistivities of the resulting fabrics are reported in the table.

TABLE

| Ex. | Filler | PTFE emulsion [a] | Cure period (min.) | Static charge (coulomb) | Resistivity (ohm/cm.$^2$) |
|---|---|---|---|---|---|
| 1 | Stainless steel | 852-202 | 30 | $1.5 \times 10^{-9}$ | $8.2 \times 10^{12}$ |
| 2 | Aluminum | 850-202 | 10 | $5.5 \times 10^{-9}$ | c $10^9$ |
| 3 | None [b] | 850-202 | 30 | $15.0 \times 10^{-9}$ | $4.1 \times 12^{12}$ |
| 4 | Stainless steel | 850-201 | 20 | $3.5 \times 10^{-9}$ | $2.3 \times 10^{11}$ |
| 5 | Aluminum | 852-202 | 15 | | $1.4 \times 10^{13}$ |
| 6 | None | 852-202 | 30 | $20 \times 10^{-9}$ | $2.6 \times 10^{14}$ |

[a] Du Pont designation.
[b] Containing chromic oxide and phosphonic acid.
[c] Measured at room temperature and at 10% relative humidity.

The final thickness of the fabric of Example 1 is observed to be 9.5 mils and has an abrasion resistance of $28 \pm 6$ mg. and a folding endurance of $93000 \pm 13000$ cycles. Abrasion resistance of the fabric in Example 6 is about 46 mg.

The textile which forms the substrate can by any kind of fiber such as staple, floc, yarn (either continuous or spun) or fabric (woven, knitted or of non-woven variety). It is essential, of course, that the substrate textile not melt or decompose at temperatures used for the curing of PTFE. Generally, any material is suitable which will tolerate exposure to a temperature of about 400° C. The textile may be either inorganic or organic. Among suitable inorganic materials are asbestos, glass, silica, silicon carbide, alumina and high melting metals. Among the organic materials are carbon, graphite, PTFE fibers, the high melting polyamides, polyurethanes and polyamides (such as the wholly aromatic polyamides disclosed in U.S. 3,094,511 and 3,287,324 and the acid-grafted polyamides disclosed in U.S. 3,099,631).

PTFE Application Technique

The PTFE is preferably applied to the textile substrate from an emulsion using a spray, dip or padding technique. A pre-treatment of the textile substrate with a silicone compound as described above may be included but is not essential. Preferably, the PTFE emulsion contains an adhesive such as the emulsion designated No. 852–202 available from E. I. du Pont de Nemours & Co. Generally such emulsions (preparation of a typical type of which is described in U.S. 2,613,193) contain a surfactant such as a long chain alkyl aryl polyether alcohol (e.g., octyl phenyl polyglycol ether) and contain from about 50 to 60% solids of which about 95% by weight if PTFE. The use of chromic acid and combinations of chromic acid and phosphoric acid as well as alkali metal silicates to improve adhesion to the substrates is known in the art as pointed out previously above.

Fillers

The filler is water insoluble, of any shape, including spherical having a particle size from one to 75 microns in diameter. Often the particle size distribution of a particular filler will vary throughout the above range. For example, a commonly available stainless steel pigment has a particle size as follows:

| Largest size particle retained in screen: | Percent |
|---|---|
| 74 microns (200 mesh) | 100 |
| 44 microns (325 mesh) | 98 |
| 20 microns | 65 |
| 10 microns | 31 |

Larger sized filler particles tend to settle to the bottom of their mixtures with PTFE emulsions. However, the emulsion may be agitated prior to use in order to resuspend the larger particles. The filler particle have a hardness on the Mohs scale of at least 1 and preferably of 6.

Any filler compatible with PTFE can be used in the present invention. Compatibility with PTFE is used in the sense that the filler does not separate from aqueous emulsion. Stainless steel, ordinary steel, lead, aluminum, glass, silicon, carbide, silica, aluminum oxide and titanium oxide are examples of suitable filler materials.

At least about 1% by weight of filler based on PTFE is needed in the applied PTFE emulsion to provide noticeably improved abrasion resistance. It is preferred to use at least about 5% of filler based on PTFE.

Curing Conditions

The PTFE emulsion is applied to the dry textile substrate and after any excess emulsion has been drained off. The structure is air-dried and is then cured at a temperature from about 340° C. to about 400° C. Generally a temperature of about 390° C. for from 5 to 40 minutes is preferred. Higher temperatures can be employed to reduce exposure periods at curing temperatures.

Final Structure and After-Treatment

The final structure has the suppleness and flexibility characteristic of a textile. Generally a coating of from about 20 to 60% of the total weight of the final structure provides the desired properties. When as much as 80% coating is applied, suppleness of the structure is reduced. Generally, it is preferred to employ about 50% of coating based on the weight of the final structure. Once the PTFE coating has been cured, no further after-treatments are necessary; however, it may be desirable to calender, emboss or laminate the final product. The structure of the present invention is adaptable to such operations as readily as is one which contains no filler.

UTILITY

The textiles of the present invention are useful as high temperature shields, antistatic linings, car tops and headliners, non-sticking surfaces, non-flammable paddings, packing seals, high-temperature and abrasive resistance belts, shields against radio frequency and microwave energy, filter cloths, anti-friction bearings and carpeting.

Many equivalent modifications will become apparent to those skilled in the art from a reading of the above without a departure from the invention concept.

What is claimed is:

1. A structure comprising a fabric made up of a high melting textile substrate bearing an antistatic coating of polytetrafluoroethylene in an amount of from about 10-60% based on weight of the fabric, said coating containing from about 0.5 to about 30% by weight, based on the coating, of a filler of hard, water insoluble particulate matter having a particle size of at least one micron in diameter and selected from the group of metals consisting of aluminum and stainless steel.

2. The structure of claim 1 wherein the textile substrate is glass.

3. The structure of claim 2 wherein the textile substrate is fiberglass.

4. The structure of claim 3 wherein the filler is aluminum.

5. The structure of claim 3 wherein the filler is stainless steel.

6. The structure of claim 5 wherein particle size distribution of the stainless steel filler is such that 100% is less than 74 microns, 98% is less than 44 microns, 65% is less than 20 microns and 31% is less than 10 microns.

7. A process of making the structure of claim 1 which comprises spraying an emulsion containing about 50% by weight of polytetrafluoroethylene and from about .2% to about 15% by weight of a filler of hard, water insoluble particulate matter of at least micron size and selected from the group of metals consisting of aluminum and stainless steel upon a high melting textile substrate to form a coating on said substrate and thereafter curing the coating by subjecting it to a temperature of from 340° C. to 400° C. for a period of from about 5 minutes to 40 minutes.

References Cited

UNITED STATES PATENTS

| | | | |
|---|---|---|---|
| 2,843,502 | 7/1958 | Fay | 117—65 |
| 3,202,626 | 8/1965 | Fitzsimmons | 260—29.6 F |
| 3,573,230 | 3/1971 | Voorhees | 260—41 B |

EDWARD G. WHITBY, Primary Examiner

U.S. Cl. X.R.

28—74 R, 75 R; 117—98, 124 E, 126 GM, 126 GR, 161 R; 161—83, 93, 158, 204, 218; 260—29.6 F, 41 B